Oct. 10, 1933.  G. K. LEWIS  1,930,345
EDGE FORMATION FOR COMPOSITE PANELS AND METHOD OF MAKING SAME
Filed April 16, 1931
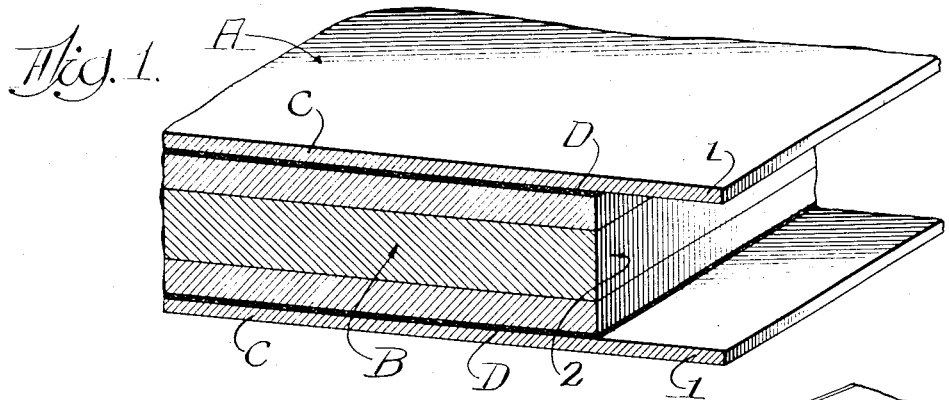
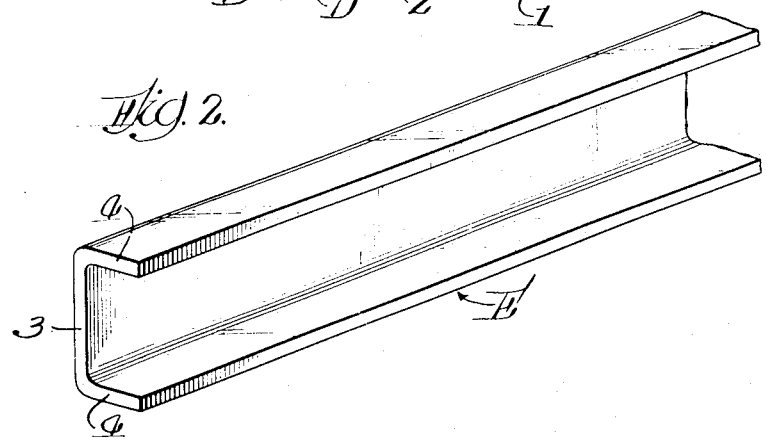
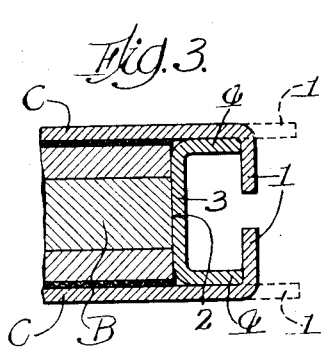 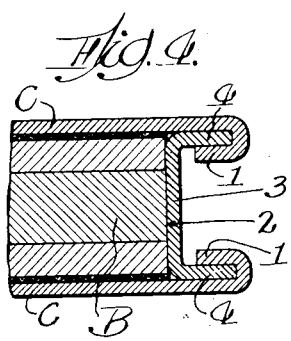 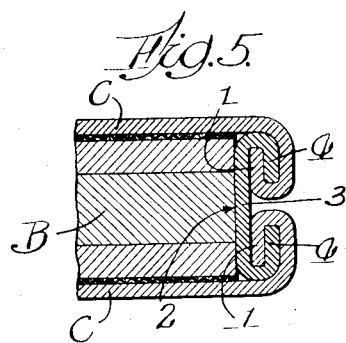
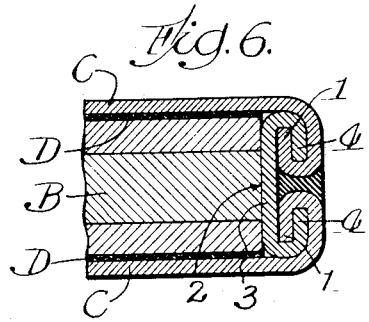
Inventor;
George K. Lewis
BY George I. Haight
Atty.

Patented Oct. 10, 1933

1,930,345

UNITED STATES PATENT OFFICE 1,930,345

EDGE FORMATION FOR COMPOSITE PANELS AND METHOD OF MAKING SAME

George K. Lewis, Chicago, Ill., assignor to Carroll C. Kendrick, Chicago, Ill.

Application April 16, 1931. Serial No. 530,683

2 Claims. (Cl. 20—15)

My invention relates to improvements in a composite structure known as laminated panels made up of superposed laminations of wood and exterior sheathings of sheet metal, and the object is to provide a method for strengthening and finishing off the edging of said panels.

A further object is to provide a composite laminated panel structure having the edge or edges of its metal sheathing folded and interlocked in a manner to strengthen the edge of the panel, form a smooth finished edging, and seal the edging of the panel against the entrance of moisture. As a result of my invention the interior superposed laminations of wood veneer are drawn together at their edges and securely clamped against separation.

Other objects of my invention will appear hereinafter.

Referring to the accompanying drawing,

Fig. 1 is a sectional view of a composite or laminated panel prepared for the initial forming or folding of the edge portions of the outer metallic sheathing to form a finished edge for the panel;

Fig. 2 is a perspective view of the channel-shaped insert about which the edges of the panel sheathing are formed and interlocked;

Fig. 3 is a sectional view similar to Fig. 1, showing the channel-shaped insert in position between the outer laminations of the panel, and the first stage of the folding operation of the edges of the sheathing having been accomplished;

Fig. 4 is a similar view showing the next step in the folding or bending of the edges of the sheathing about the legs of the insert;

Fig. 5 shows the final folding operation of the edge portions of the sheathing and the legs of the insert into interlocked relation; and Fig. 6 is a similar section to Fig. 5, showing the crevice between the folds or bends filled with solder to seal and finish off the edge of the panel.

Composite panels of the type to which my invention is particularly applicable, are made up of a plurality of superposed laminations bonded together by glue or other suitable adhesive and compressed into intimate relation. Panels of this character are extensively used for various purposes, such as partitions in containers of various kinds, vehicle bodies and the like. Wherever the edges of the panels are exposed, as, for instance, the edges defining the door or window opening, a door or the cover of a container, it is desirable to finish off the edges so that they will not only present a finished appearance, but will be strengthened and sealed against the entrance between the laminations.

In the structure shown in the drawing, the panel A is made up of a body or core portion B and the outer laminations or sheathings C. The core B is preferably composed of several layers or laminations of wood, in the present case three, superposed one upon the other and glued by a suitable adhesive. The outer layers or laminations C are composed of sheet metal, and between the sheet metal sheathings and the faces of the body there is provided a layer of fabric D, such as Canton flannel, which forms a bond between the wood body and the sheet metal laminations sufficiently yielding or flexible to permit of relative expansion between the body and sheet metal laminations, thereby preventing separation of the laminations.

In the process of manufacturing the panels, the core or body is built up of its several laminations and the sheet metal sheathings, to which the fabric has been previously fastened by glue, is then superposed upon the face of the core or body and the whole structure compressed to bring the laminations into compact intimate relation.

In accordance with my invention, I arrange the panel structure so that the edge portions 1 of the exterior sheathings C project beyond the edge face 2 of the core or body. This may be accomplished either by placing the sheet metal laminations in position on the core, with their edges projecting, or by placing the edges of the laminations flush with the edge face of the core and then cutting back the edge portion of the core sufficiently to establish the relation between the edge face 2 and the edge portions 1, as shown in Fig. 1. This latter condition arises where the panel to be edged is cut from a larger piece; the cut being made in a plane at right angles to the plane of the panel.

I also provide a metal insert E which is adapted to be inserted in the channel or groove formed at the edge in the panel, as shown in Fig. 1. This insert is formed channel-shape in cross section by the provision of a bottom wall 3 having flange portions or legs 4 extending at right angles thereto. This insert may be inexpensively made from a flat strip of metal of proper width, having its edge portions bent at right angles to form the legs 4.

As shown in Fig. 3, the insert is positioned in the groove at the edge of the panel in such manner that its bottom wall 3 abuts against and is disposed parallel with the edge face 2 of the panel body. The leg portions 4 extend outwardly parallel with and preferably in contact with the projecting edge portions 1 of the sheathing laminations, but the leg portions terminate sufficiently short of the extreme edges of the portions 1 so that these portions may be folded or bent inwardly and then into parallel relation to the legs 4, so that the edge portions 1 embrace the legs 4 of the insert and interlock therewith.

Having thus folded the edge portions 1 in the manner illustrated in Fig. 4, the folded edge portions 1 and the legs 4 of the insert are then folded together into substantially parallel relation with the bottom wall 3 of the insert and thus, also, into parallel relation to the end face 2 of the body of the panel.

The bends in the metal may be made sharp, so that the finished edge may be substantially square with the face of the panel, or these bends may be made on greater radii so that the finished edge will present a more rounded appearance.

The parts are preferably so proportioned that when the final folds or bends are made, the folded portions from the two sheet metal laminations on opposite faces of the panel will meet, or substantially meet, in the center of the thickness of the panel. There will be, however, a crevice between these folded portions, which is preferably filled with a body of solder. The solder is flowed into the crevice to fill up the interstices and then smoothed off flush with the outer faces of the edge portion, thereby securing the folded edge portions against displacement and sealing the edge of the panel against the entrance of moisture between the laminations.

While I have herein shown and described what I consider the preferred manner of carrying out my invention, the same is merely illustrative and I contemplate any changes that may come within the scope of the appended claims.

I claim:

1. A composite panel composed of a plurality of thin superposed inner sheets of wood veneer secured together between two thin outer sheets of metal each in turn secured to the adjacent sheets of wood veneer, the end portion of each of said outer metal sheets projecting beyond the ends of said inner sheets, a metal channel member having its base disposed flush against the aligned ends of all of said inner sheets and having its opposed outwardly projecting flange portions parallel to and contacting with and respectively enclosed by the parallel projecting and folded end portions of said metal sheets, said end and flange portions being bent inwardly towards one another at the end corners of said superposed wood sheets and into snug engagement with the base of said channel member, to draw together and securely clamp in position the ends of said inner wood sheets, whereby separation of the latter and entrance of moisture to therebetween is prevented.

2. A composite panel composed of a plurality of thin superposed inner sheets of wood veneer secured together between two thin outer sheets of metal each in turn secured to the adjacent sheets of wood veneer, the end portion of each of said outer metal sheets projecting beyond the ends of said inner sheets, a metal channel member having its base disposed flush against the aligned ends of all of said inner sheets and having its opposed outwardly projecting flange portions parallel to and contacting with and respectively enclosed by the parallel projecting and folded end portions of said metal sheets, said end and flange portions being bent inwardly toward one another at the end corners of said superposed wood sheets and into snug engagement with the base of said channel member, to draw together and securely clamp in position the ends of said inner wood sheets, whereby separation of the latter and entrance of moisture to therebetween is prevented, and a sealing compound in the exposed space between said folded and bent portions to form a smooth uninterrupted edge on said composite panel.

GEORGE K. LEWIS.